United States Patent [19]
Amari
[11] Patent Number: 4,947,343
[45] Date of Patent: Aug. 7, 1990

[54] DOCUMENT PROCESSING SYSTEM FOR DETECTING AN OVERLAP IN TWO CHARACTERS

[75] Inventor: Takashi Amari, Tokyo, Japan
[73] Assignee: Canon Kabushiki Kaisha, Tokyo, Japan

[21] Appl. No.: 449,322
[22] Filed: Dec. 11, 1989

Related U.S. Application Data

[63] Continuation of Ser. No. 170,252, Mar. 18, 1988, abandoned.

[30] Foreign Application Priority Data

Mar. 23, 1987 [JP] Japan ................................ 62-065690
Mar. 23, 1987 [JP] Japan ................................ 62-065691

[51] Int. Cl.[5] ................................................ G06F 15/04
[52] U.S. Cl. ..................................... 364/518; 340/723; 364/523
[58] Field of Search ................................. 364/518–523; 340/721, 723, 724; 382/44–47

[56] References Cited

U.S. PATENT DOCUMENTS 4,323,315 4/1982 Demonte et al. ..................... 400/63
4,694,405 9/1987 Bradbury et al. .................... 364/518
4,703,438 10/1987 Nishiyama et al. ................. 364/519
4,757,462 7/1988 Sato et al. ........................... 364/519

FOREIGN PATENT DOCUMENTS 3042145 6/1982 Fed. Rep. of Germany .

*Primary Examiner*—Gary V. Harkcom
*Assistant Examiner*—H. R. Herndon
*Attorney, Agent, or Firm*—Fitzpatrick, Cella, Harper & Scinto

[57] ABSTRACT

A document processing system includes a display pattern memory having an address space in one-to-one corresponding with a printable area of a printing unit and a display unit for displaying character pattern dot information stored in the display pattern memory. A superposition determination unit for determining based on a predetermined operation a superposition between a character pattern of a character code read from the character pattern memory and stored in the display pattern memory and a character pattern to be sequentially input while a character print position is designated and an indication unit for indicating the determination result by the superposition determination unit.

10 Claims, 18 Drawing Sheets

FIG. 5

| VIDEO RAM ADDRESS | CONTENTS (HEXA DECIMAL) |
|---|---|
| 0 | 0 0 |
| 1 | 7 8 |
| 2 | 0 E |
| ¦ | ¦ |
| 5 | 0 E |
| 6 | 7 8 |
| 7 | 0 0 |

FIG. 7A

| INPUT | | OUTPUT |
|---|---|---|
| A | B | X |
| 0 | 0 | 0 |
| 0 | 1 | 1 |
| 1 | 0 | 1 |
| 1 | 1 | 1 |

FIG. 7B

| INPUT | | OUTPUT |
|---|---|---|
| A | B | X |
| 0 | 0 | 0 |
| 0 | 1 | 1 |
| 1 | 0 | 1 |
| 1 | 1 | 0 |

| INPUT | | OUTPUT |
|---|---|---|
| A | B | X |
| 0 | 0 | 0 |
| 0 | 1 | 1 |
| 1 | 0 | 1 |
| 1 | 1 | 1 |

| INPUT | | OUTPUT |
|---|---|---|
| A | B | X |
| 0 | 0 | 0 |
| 0 | 1 | 1 |
| 1 | 0 | 1 |
| 1 | 1 | 0 |

FIG. 17A f(x)=x sin x

FIG. 17B f(x)=xsinx

FIG. 20A

| INPUT | | OUTPUT |
|---|---|---|
| A | B | X |
| 0 | 0 | 0 |
| 0 | 1 | 1 |
| 1 | 0 | 1 |
| 1 | 1 | 1 |

FIG. 20B

| INPUT | | OUTPUT |
|---|---|---|
| A | B | X |
| 0 | 0 | 0 |
| 0 | 1 | 1 |
| 1 | 0 | 1 |
| 1 | 1 | 0 |

DOCUMENT PROCESSING SYSTEM FOR DETECTING AN OVERLAP IN TWO CHARACTERS

This application is a continuation of application Ser. No. 170,252 filed Mar. 18, 1988, now abandoned.

BACKGROUND OF THE INVENTION

1. Field of the Invention

The present invention relates to a document processing system having a character printing unit by which a character can be printed on a desired position of a printing medium.

2. Related Background Art

Conventional text processing systems such as word processors, electronic typewriters and the like are constructed so as to easily produce an unnatural or irregular text by designating a control key such as a print position fine feed key to finely move a character printing unit or head to the right and left and to finely move a platen up and down and print a character on a printing medium at a desired position.

For example, if an unnatural text such as a formula f (x)=x·sin x shown in FIG. 17A is printed using an ordinary print pitch, a relatively large space is placed between the function symbol "f" and the next left parenthesis so that the printed formula is unbalanced as a whole.

In view of this, the conventional system is provided with a print position fine feed key in order to print the left parenthesis "(" at a most suitable position in the formula as shown in FIG. 17B.

However, in a conventional text processing system, the position of the left parenthesis "(" in the formula cannot be displayed to determine if it is at a suitable position, unless it is actually printed out on the printing medium.

Such phenomenon is related to the use of a display unit mounted on such a text processing system. Namely, in a conventional system, character display is controlled in units of one character, and the display position or address of the display unit at which a character pattern of an input character code is displayed, is unambiguously determined based on the address in a memory in which the display information has been stored, and based on the size of character dot pattern. Consequently, the display position of an input character can not be determined finer than one character unit, thus preventing a change in the display position if an input character to be printed is moved at a finer position than one character unit.

If an input character is changed in position, an operator must print it in order to confirm whether the change was actually and correctly performed on the printing medium. Thus, setting an optimum position of a character may cause an operator to have various experiences, misprints, soiled prints, and blanked portions due to the use of correction agent. Such blanked portions often arise in the case where the positions of consecutive characters are to be adjusted because even if a first character is correctly moved, this character and the next character are often blanked to obtain an optimum relative position if the latter is moved erroneously. Very cumbersome correction becomes necessary particularly for small character fonts such as characters printed below a character string. Further, if such correction is necessary, the printing material such as an ink ribbon must be manufactured using a proper material for such correction, resulting in a considerably large continuous cost. Furthermore, the need for such correction results in poor operability of the print position control function.

SUMMARY OF THE INVENTION

It is an object of the present invention to provide a document processing system wherein a character pattern is stored and displayed in positional correspondence with a printable area of a character printing unit. More specifically, the system determines a superposition between the displayed character pattern and an input character pattern so that the input character pattern can be displayed in just the same manner as the character printing unit prints the input character and so that a superposed portion between the character patterns can be distinguishably displayed, thus enabling the system to print an unnatural text at a desired print pitch.

It is another object of the present invention to provide a document processing system wherein a character pattern is stored and displayed in positional correspondence with a printable area of a character printing unit. More specifically, the system determines a superposition between the displayed character pattern and an input character pattern by developing a judgement-reference character pattern corresponding to the displayed character pattern in a virtual memory space so that the input character pattern can be displayed in just the same manner as the character printing unit prints the input character and a superposed printing between the character patterns can be avoided, thus enabling the system to print an unnatural text at a desired print pitch.

It is a further object of the present invention to provide a document processing system capable of correctly judging a superposition between characters irrespective of the resolving power of a display unit.

BRIEF DESCRIPTION OF THE DRAWINGS

FIG. 5 shows an example of display data stored in VRAM shown in FIG. 1;

FIGS. 7A and 7B are truth tables for the OR and Exclusive-OR operations in the superposition judgement procedure;

FIGS. 17A and 17B show an example of an unnatural text printed by a conventional document processing system;

FIGS. 20A and 20B are truth tables for the OR and Exclusive-OR operations in the superposition judgement procedure;

DETAILED DESCRIPTION OF THE PREFERRED EMBODIMENTS

Figure 1:
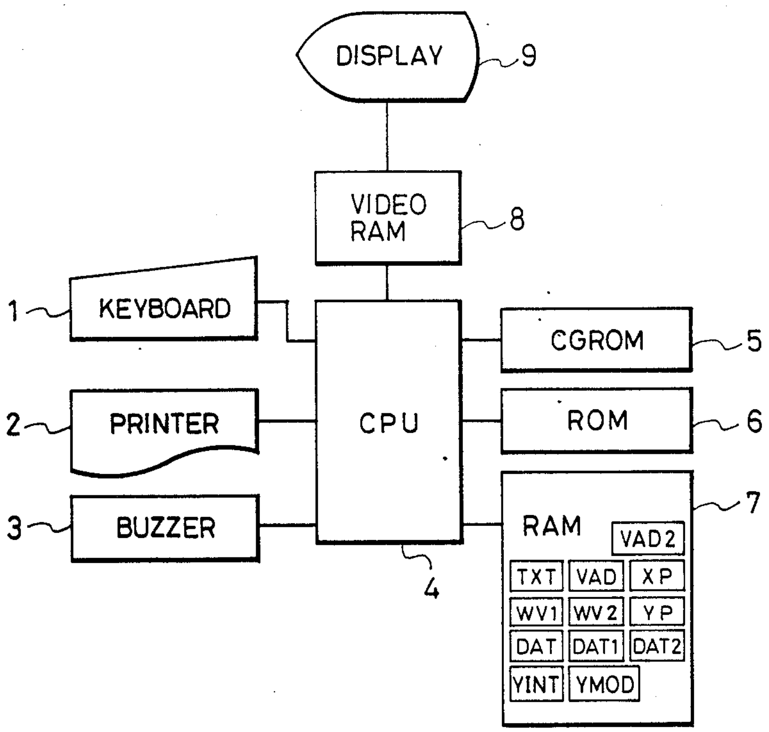
FIG. 1 is a block diagram showing an embodiment of a document processing system according to the present invention.

FIG. 1 is a block diagram illustrating the structure of an embodiment of a document processing system according to the present invention. A keyboard 1 is constructed of a character key unit from which a character code is input and a control command key unit from which control information necessary for printing is input. The input character code and control command are supplied to CPU 4. A printer 2 is used for printing an input character at a desired position. A buzzer 3 is used for generating an alarm sound when an input character is superposed upon an already input character and when an erroneous input is effected from the keyboard 1, to thereby notify the operator of such an effect. CPU 4 controls peripheral devices such as the keyboard 1 and printer 2 in accordance with a control program stored in ROM 6 and by using work areas of RAM 7 described later. CGROM 5 functions as a character pattern memory and stores, at predetermined addresses, character patterns (e.g., constructed of an 8×8 dot matrix) which are in one-to-one correspondence with character codes input from the keyboard 1. ROM 6 stores control programs (including those programs for the steps of the procedure shown in the flow charts described later) to be executed by CPU 4, and associated data. A video RAM (VRAM) 8 functions as a display pattern memory and has a display space in one-to-one correspondence with the printable area of the printer 2. The character pattern developed in VRAM 8 is displayed on a display unit 9 in the form of dot patterns.

CPU 4 which operates as superposition determination means and indication means of this invention, determination a superposition between a character pattern of a character code read out of CGROM 5 and stored in VRAM 8 and a character pattern of a character code input from the keyboard 1 and designated with a print position, in accordance with a predetermined arithmetic operation. If the already input and newly input character patterns are decided, based on the determination result, to be superposed, then the superposed part of one pattern upon another is displayed distinguishably from the remainder to notify the operator of such effect by means of the buzzer 3.

Figure 2A:
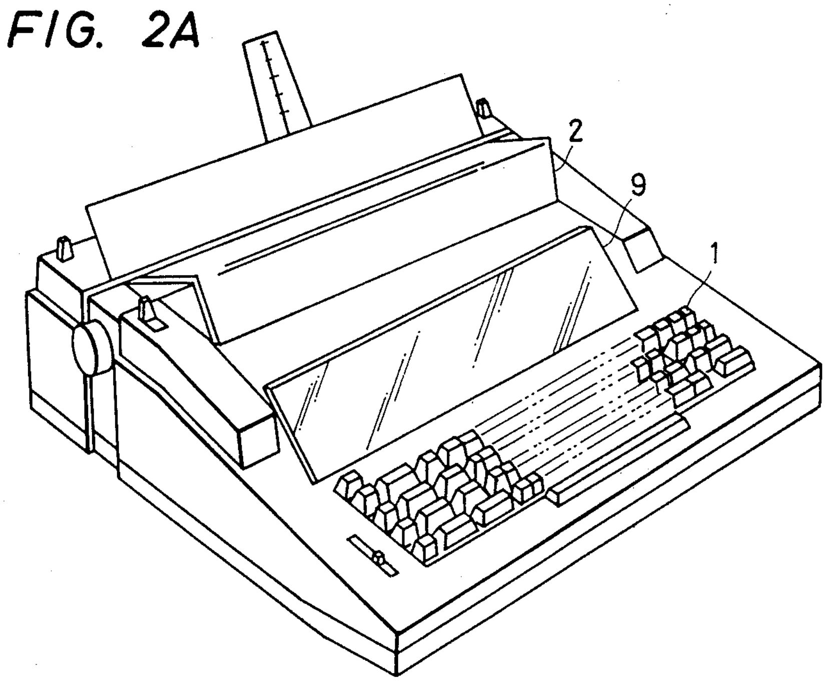
FIGS. 2A and 2B are a perspective view and a plan view showing one example of a document processing system of this invention.
Figure 2B:
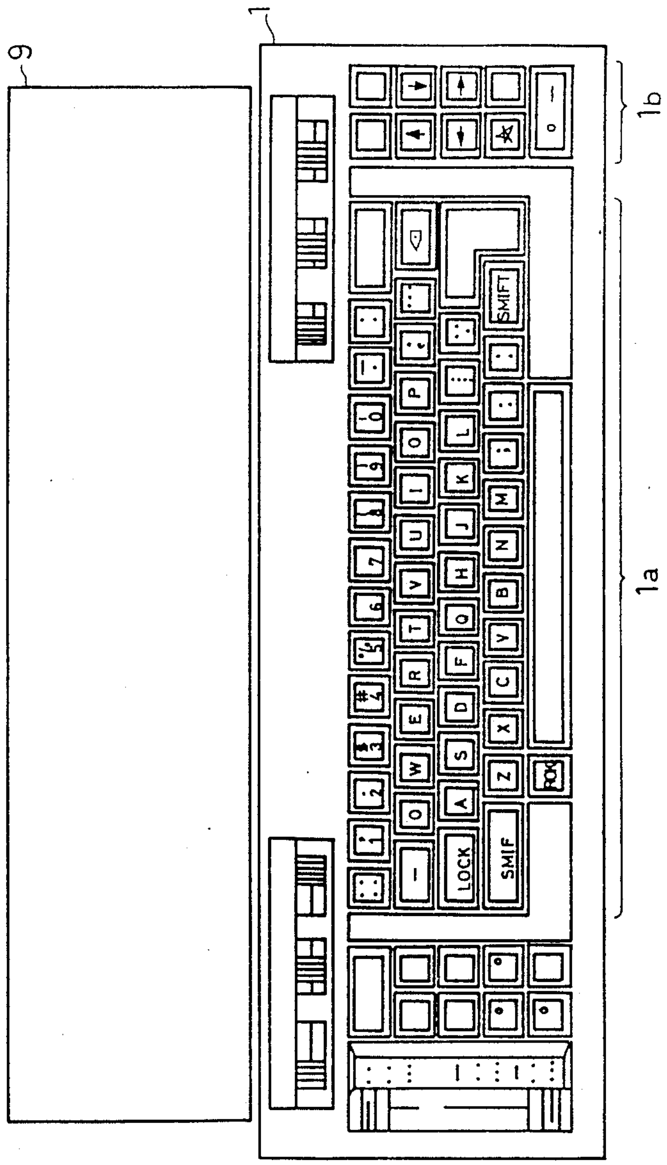

FIGS. 2A and 2B are a perspective view and a plan view, respectively, showing the document processing system of this invention, wherein similar elements to those in FIG. 1 are represented by using identical reference numerals.

In FIG. 2B, a character key unit 1a is constructed of character keys with which character codes are input. A control command key unit 1b is constructed of cursor keys and the like with which control information necessary for document editing and printing is input.

Figure 3A:
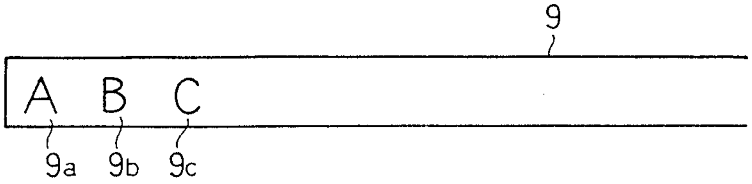
FIG. 3A shows one example of a display on the display unit shown in FIG. 1.

FIG. 3A shows an example of a display on the display unit 9 shown in FIG. 1, wherein character patterns 9a to 9c (representative of characters A to C) are displayed on the display unit 9 at predetermined areas.

Figure 3B:
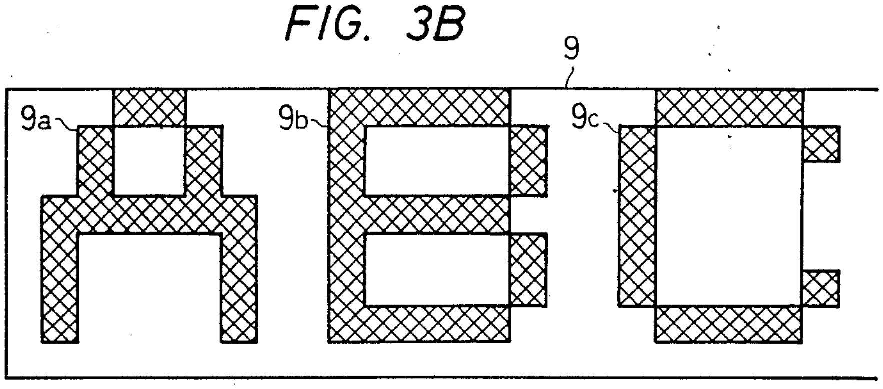
FIG. 3B is an enlarged view of character patterns shown in FIG. 3A.

FIG. 3B is an enlarged view of the character patterns shown in FIG. 3A, wherein identical reference characters and numerals are used to represent corresponding elements. As seen from FIG. 3B, each character pattern 9a to 9c is constructed of an 8×8 dot matrix, by way of example.

Figure 4:
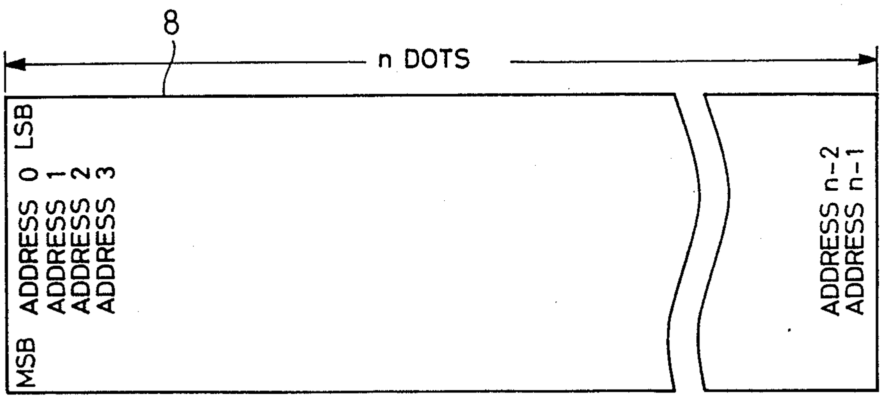
FIG. 4 shows the memory space of VRAM shown in FIG. 1.

FIG. 4 illustrates the memory space of VRAM 8 shown in FIG. 1, the memory space having 8×n (n is an integer) addresses. As seen from FIG. 4, dot patterns which can be displayed on the display unit 9 are stored in the memory space of VRAM 8 from address "0" to address "n−1". For instance, in order to display the character patterns shown in FIG. 3B on the display unit 9, values "00", "78", "0E", "09", "09", "0E", "78" and "00" in hexa decimal notation shown in FIG. 5 are stored in VRAM 8 from address "0" to address "7".

The operation of the document processing system shown in FIG. 1 will be described next.

Character data input from the keyboard 1 are sequentially stored in a work area TXT (text store area) of RAM 7, and the associated print position information determined by an input from the keyboard 1 and stored as the content of a work area XP (store area for print start position information in the x-direction) of RAM 7 are also sequentially stored in work area TXT. Each time a character is stored, CPU 4 executes the control program stored in ROM 6 in the following manner. The contents of CGROM 5 are displayed on the display unit 9 at the positions corresponding to addresses of VRAM 8 while performing a logical OR operation (Exclusive-OR operation), the addresses corresponding to the associated character print positions on a printing medium. Thus, the display unit 9 displays a superposed portion of an input character pattern, visually distinguishable from the other displayed character patterns, e.g., by means of a blanked portion, an inverted portion, a flashed portion or a combination thereof.

In particular, in accordance with the program in ROM 6, CPU 4 first saves a part of the contents of VRAM 8 at the addresses corresponding to those subjected to an OR operation with the contents of CGROM 5 on the display area of VRAM 8, into a work area WV1 (store area for a first pattern) of RAM 7. Then, the contents of VRAM 8 with the newly input character written therein are stored in a work area WV2 (store area for a second pattern) and thereafter, the contents of CGROM 5, WV1 and WV2 are subjected to an OR operation to judge if the newly input character pattern from CGROM 5 into VRAM 8 is superposed on the already input character pattern on VRAM 8. The resultant superposition determination is then notified to the operator by means of the buzzer 3. The operator notified of the character superposition then can adjust the print position to thereby enable the system to reduce misprints.

The operation for determining a superposition of an input character will be described with reference to FIGS. 6A to 6E.

Figure 6A:
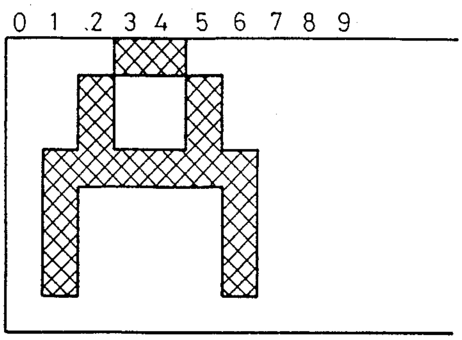
FIGS. 6A to 6E illustrate an operation for judging a superposition of an input character according to the present invention.
Figure 6B:
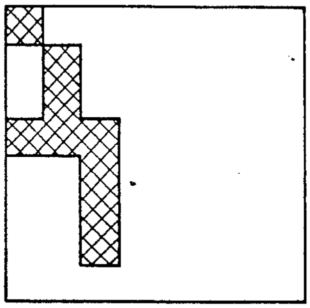
Figure 6C:
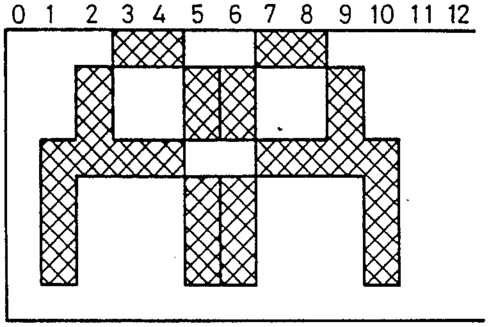
Figure 6D:
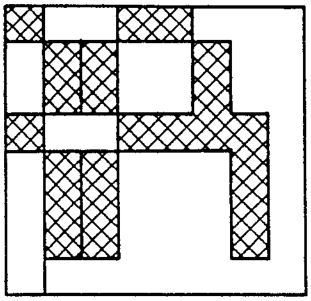
Figure 6E:
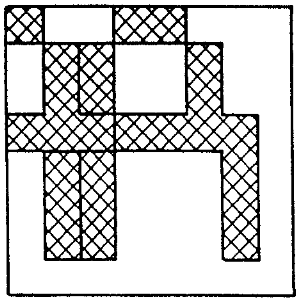

It is first assumed that a character pattern "A" is already stored in VRAM 8 as shown in FIG. 6A. Upon input of a new character "A" at a character print start position (Xp=4) in the x-direction of VRAM 8 stored in work area XP of RAM 7, the address VAD at VRAM 8 is calculated as "4" based on the value Xp of "4". Then, one display area of consecutive eight bytes starting from the fourth byte of VRAM 8 is read and the contents thereof in the form of dots are stored in work area WV1 as shown in FIG. 6B. Next, the pattern information (dot pattern of character "A") stored in CGROM 5 is stored in VRAM 8 at addresses starting from the fourth byte while performing an Exclusive-OR operation with the already loaded pattern, to accordingly obtain a pattern with the superposed portion between characters being blanked as shown in FIG. 6C. Similar to the above, one display area of consecutive eight bytes starting from the fourth byte of VRAM is read and the contents thereof in the form of dots are stored in work area WV2 as shown in FIG. 6D. Next, the character pattern stored in work area WV1 shown in FIG. 6B and a character pattern "A" read from CGROM 5 are subjected to a logical OR operation under the control of CPU 4. The resultant character pattern as shown in FIG. 6E is stored in work area WV1, which pattern has the values "09", "7E", "7E", "09", "09", "0E", "78" and "00" in hexa decimal notation. This pattern does not coincide with the character pattern shown in FIG. 6B so that CPU 4 recognizes an occurrence of a superposition between the already input and newly input character patterns and causes the buzzer 3 to be actuated to notify the operator of such superposition.

Next, the superposition determination procedure of this invention will be described with reference to FIGS. 7A and 7B and FIGS. 8A and 8B.

FIGS. 7A and 7B are truth tables for the OR and Exclusive-OR operations in the superposition determination procedure, wherein A and B denotes an input and X denotes an output.

Figure 8A:
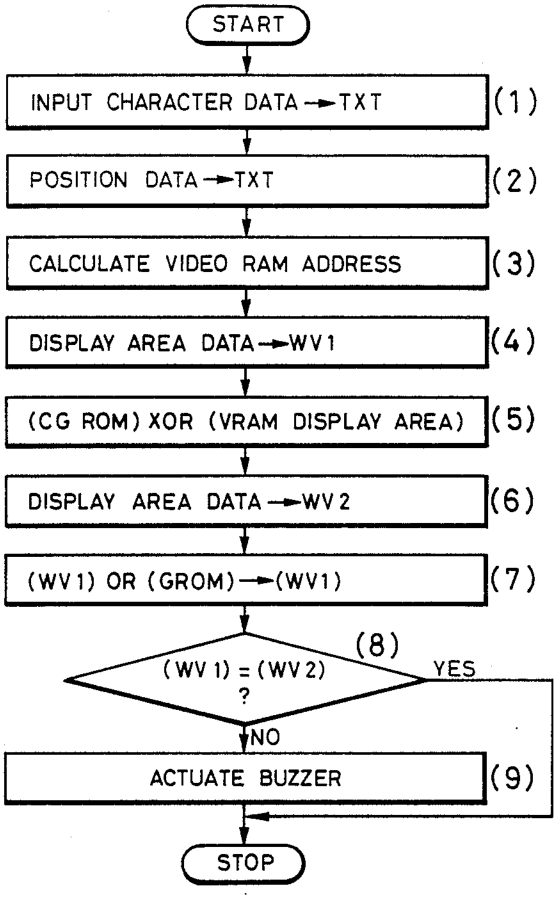
FIGS. 8A and 8B are flow charts illustrating a superposition judgement procedure according to the present invention.
Figure 8B:
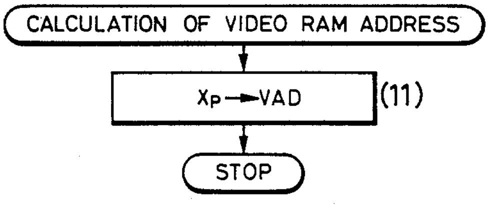

FIGS. 8A and 8B are flow charts illustrating the superposition determination procedure of this invention, wherein (1) to (9) and (11) denotes a step of the procedure.

First, character data input from the keyboard 1 is stored in work area TXT of RAM 7 (step 1), and print position data (display position information) Xp is stored in work area TXT of RAM 7 (step 2). Then, the address at VRAM 8 corresponding to a print position is calculated in accordance with the flow shown in FIG. 8B (step 3). The calculated address VAD at VRAM 8 is used as a reference address to copy data within a character display area, i.e., within a region of 8 x 8 dots in row and column, into work area WV1 (step 4). Thereafter, the pattern information of a character to be displayed is read from CGROM 5 and subjected to an Exclusive-OR operation with the already inputted character pattern on the display area of VRAM 8 to display the operation result (step 5). This operation corresponds to an operation of setting the contents in the display area of VRAM 8 as input A of FIG. 7B and the character pattern "A" from CGROM 5 as input B, performing an Exclusive-OR operation between both the character patterns, and transferring output X to the display area of VRAM 8.

Then, the data in the display area of VRAM 8 are copied into work area WV2 (step 6). Thereafter, a logical OR operation is performed between the contents of work area WV1 and the character pattern "A" read from CGROM 5 to write the result into work area WV1 (step 7). This operation corresponds to an operation of setting the contents of work area WV1 as input A of FIG. 7A and the character pattern "A" read from CGROM 5 as input B, performing an 0R operation therebetween, and transferring output X work area WV1. Next, it is determined if the contents of work area WV1 corresponding to the display area completely coincide with the contents of work area WV2 (step 8). If YES, it is determined there is no contention (superposition) between character patterns to terminate the determination procedure. If NO, the buzzer 3 is actuated to notify the operator of the fact that the newly input character becomes superposed upon the already input character to thereafter terminate the determination procedure (step 9).

In the above step 3, the flow shown in FIG. 8B is executed. Since this embodiment employs the display unit 9 constructed of one line, the display position information Xp is converted into the address VAD at VRAM 8 (step 11) to follow step 4 and succeeding steps.

Another embodiment of the present invention will be described next with reference to FIG. 1.

Character data input from the keyboard 1 are sequentially stored in a work area TXT (text store area) of RAM 7, and the associated print position information determined by an input from the keyboard 1 and stored as the content of a work area XP (store area for print start position information in the x-direction) of RAM 7 are also sequentially stored in work area TXT. Each time a character is stored, CPU 4 executes the control program stored in ROM 6 in the following manner. The contents of CGROM 5 are displayed on the display unit 9 at the positions corresponding to addresses of VRAM 8 while performing a logical OR operation, the addresses corresponding to the associated character print positions on a printing medium. Thus, the display unit 9 displays a superposed portion of an input character pattern, visually distinguishable from the other displayed character patterns.

In particular, in accordance with the program in ROM 6, CPU 4 first saves a part of the contents of VRAM 8 at the addresses corresponding to those subjected to an OR operation with the contents of CGROM 5 on the display area of VRAM 8, into a work area WV1 (store area for a first pattern) of RAM 7. Then, the contents of VRAM 8 with the newly input character written therein are stored in a work area WV2 (store area for a second pattern) and thereafter, the contents of CGROM 5, WV1 and WV2 are subjected to an OR operation to determine if the newly input character pattern from CGROM 5 into VRAM 8 is superposed on the already input character pattern on VRAM 8. The resultant superposition determination is then notified to the operator by means of the buzzer 3. The operator notified of the character superposition then can adjust the print position to thereby enable the system to reduce misprints.

The operation for determining a superposition of an input character will be described with reference to FIGS. 9A to 9F, wherein identical reference numeral is used to represent a similar element to that shown in FIG. 1.

Figure 9A:
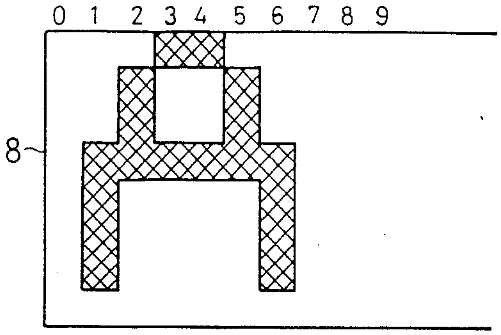
FIGS. 9A to 9F illustrate another operation for judging a superposition of an input character according to the present invention.
Figure 9B:
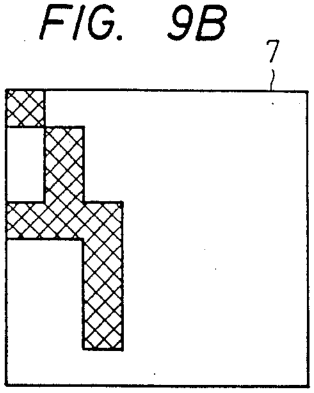
Figure 9C:
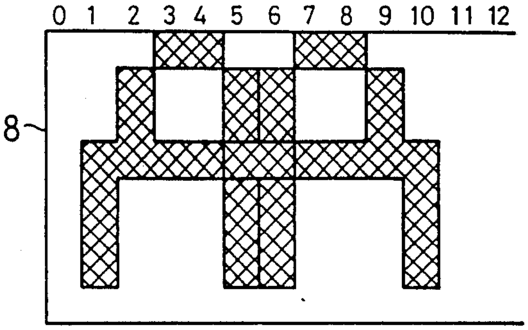
Figure 9D:
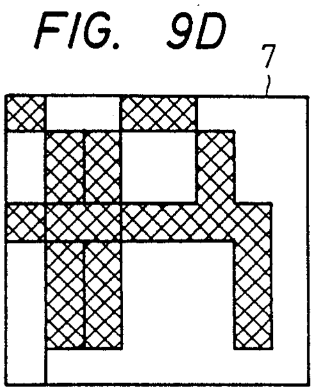
Figure 9E:
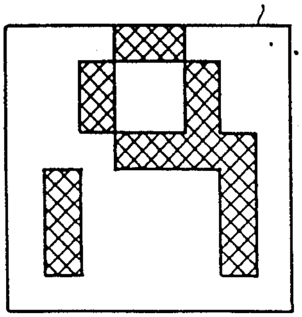
Figure 9F:
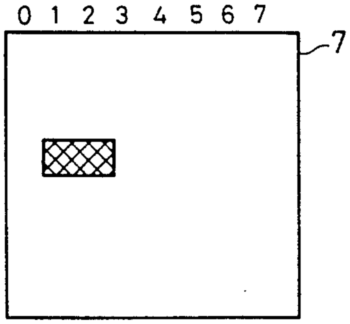

It is first assumed that a character pattern "A" is already stored in VRAM 8 as shown in FIG. 9A. Upon input of a new character "A" at a character print start position ($X_p=4$) in the x-direction of VRAM 8 stored in work area XP of RAM 7, the address VAD at VRAM 8 is calculated as "4" based on the value Xp of "4". Then, one display area of consecutive eight bytes starting from the fourth byte of VRAM 8 is read and the contents thereof in the form of dots are stored in work area WV1 as shown in FIG. 9B. Next, the pattern information (dot pattern of character "A") stored in CGROM 5 is stored into VRAM 8 at addresses starting from the fourth byte while performing an OR operation with the already loaded pattern, to accordingly obtain a pattern as shown in FIG. 9C. Similar to the above, one display area of consecutive eight bytes starting from the fourth byte of VRAM is read and the contents thereof in the form of dots are stored in work area WV2 as shown in FIG. 9D. Next, the character pattern stored in work area WV1 shown in FIG. 9B and a character pattern of FIG. 9D stored in work area WV2 are subjected to an Exclusive-OR operation under control of CPU 4. The resultant character pattern as shown in FIG. 9E is stored in work area WV2. After a logical Exclusive-OR operation under control of CPU between the character pattern stored in work area WV2 and that read from CGROM 5, a character pattern as shown in FIG. 9F is obtained and stored in work area WV2. The pattern has the values "00", "08", "08", "00", "00", "00", "00"and "00" in hexa decimal notation. All the values are not "0" so that CPU 4 recognizes an occurrence of a superposition between the already input and newly input character patterns and causes the buzzer 3 to be actuated to notify the operator of such superposition.

Next, the superposition determination procedure of this invention will be described with reference to FIGS. 10A and 10B and FIGS. 11A and 11B.

Figures 10A, 10B, 12:
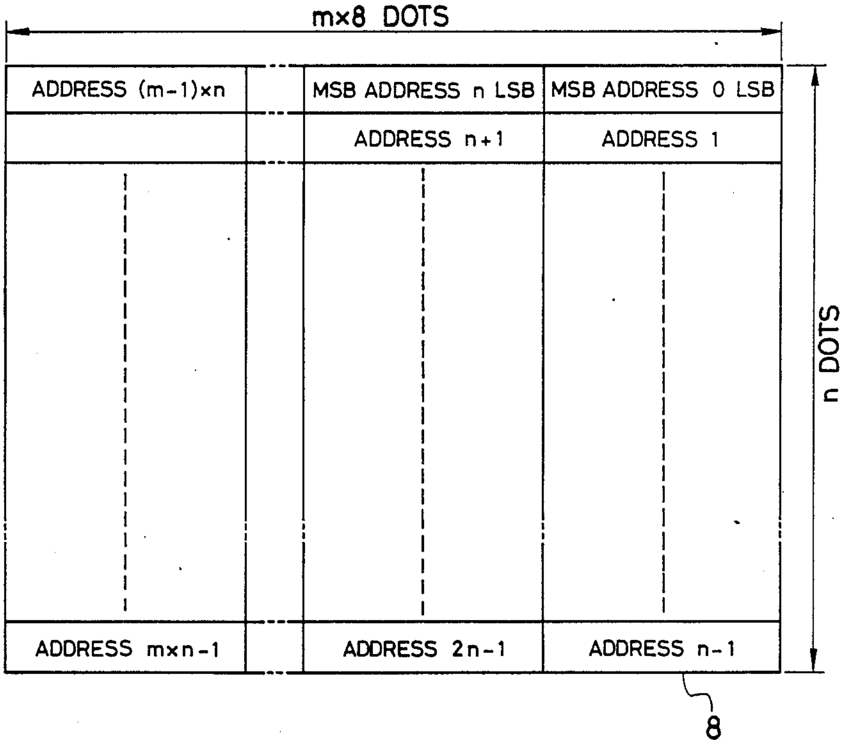
FIGS. 10A to 10B are truth tables for the OR and Exclusive-OR operations in the superposition judgement procedure.
FIG. 12 shows the memory space of VRAM used in another embodiment of a document processing system of the present invention.

FIGS. 10A and 10B are truth tables for the OR and Exclusive-OR operations in the superposition judgement procedure, wherein A and B denotes an input and X denotes an output.

Figure 11A:
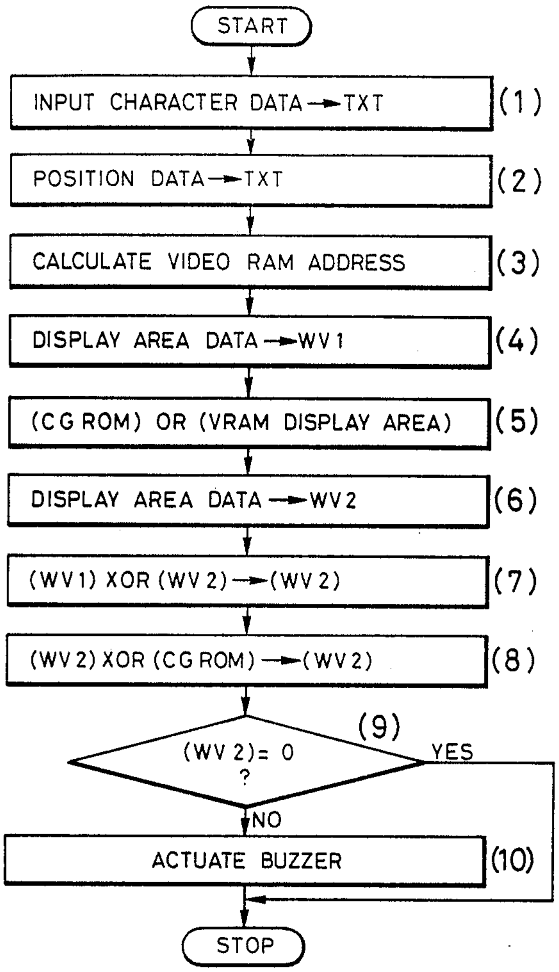
FIGS. 11A and 11B are flow charts illustrating another superposition judgement procedure according to the present invention.
Figure 11B:
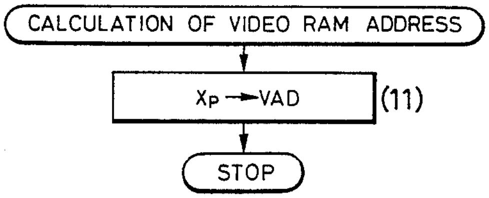

FIGS. 11A and 11B are flow charts illustrating the superposition judgement procedure of this invention, wherein (1) to (9) and (11) denote a step of the procedure.

First, character data inputted from the keyboard 1 is stored in work area TXT of RAM 7 (step 1), and print position data (display position information) Xp is stored in work area TXT of RAM 7 (step 2). Then, the address at VRAM 8 corresponding to a print position is calculated in accordance with the flow shown in FIG. 11B (step 3). The calculated address VAD at VRAM 8 is used as a reference address to copy data within a character display area, i.e., within a region of 8×8 dots in row and column, into work area WV1 (step 4). Thereafter, the pattern information of a character to be displayed is read from CGROM 5 and subjected to an OR operation with the already input character pattern on the display area of VRAM 8 to display the operation result (step 5). This operation corresponds to an operation of setting the contents in the display area of VRAM 8 as input A of FIG. 10A and the character pattern "A" from CGROM 5 as input B, performing an OR operation between both the character patterns, and transferring output X to the display area of VRAM 8.

Then, the data in the display area of VRAM 8 are copied into work area WV2 (step 6). Thereafter, a logical Exclusive-OR operation is performed between the contents of work area WV1 and work area WV2 to write the result into work area WV2 (step 7). This operation corresponds to an operation of setting the contents of work area WV2 as input A of FIG. 10B and the contents of work area WV1 as input B, performing an Exclusive-OR operation therebetween, and transferring output X into work area WV2.

Next, a logical Exclusive-OR operation is performed between the contents of work area WV2 and the newly input character pattern read from CGROM 5 to write the result into work area WV2 (step 8). If YES, it is determined there is no contention (superposition) between character patterns to terminate the determination procedure. If NO, the buzzer 3 is actuated to notify the operator of the fact that the newly input character becomes superposed upon the already input character to thereafter terminate the determination procedure (step 10).

In the above step 3, the flow shown in FIG. 11B is executed. Since this embodiment employs the display unit 9 constructed of one line, the display position information Xp is converted into the address VAD at VRAM 8 (step 11) to follow step 4 and succeeding steps.

The above embodiment has been described using the display unit 9 constructed of a matrix of 8×n dots in row and column. However, the invention is also applicable to the display unit constructed of a matrix of (m×8)×n dots in row and column.

FIG. 12 shows the memory space of VRAM used in another embodiment of the document processing system according to the present invention, the memory space being constructed of, e.g., a matrix of (m×8)×n dots in row and column.

Figure 13:
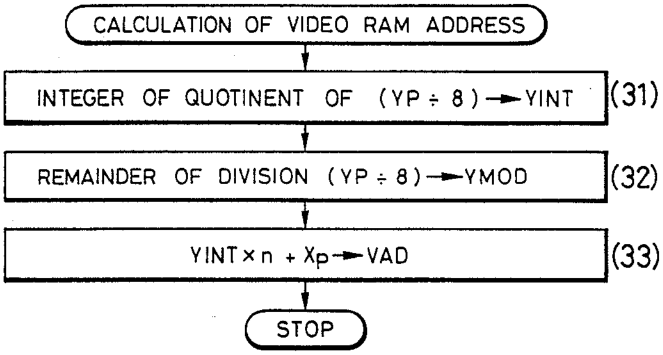
FIGS. 13 to 15 are flow charts illustrating the operation of the embodiment shown in FIG. 12.

FIG. 13 is a flow chart illustrating the procedure of calculating the address of VRAM having the memory space shown in FIG. 12, wherein (31) to (33) represent a step of the procedure and correspond to step 3 of the flow chart shown in FIG. 8A or FIG. 11A, or step 3 of the flow chart shown in FIG. 8B or FIG. 11B.

When a print position in row is input from the keyboard 1, the row position information is stored in a work area YP of RAM 7.

Then, at step 3 of the flow chart shown in FIG. 8A or FIG. 11A or in FIG. 8B or FIG. 11B, the contents of work area YP are divided by the number of unit dots in row, i.e., "8" to write the integer of quotient in a work area YINT (step 31). The remainder of the division of the contents of work area YP by "8" is stored in work area YMOD (step 32). Next, CPU 4 sets a value as the address VAD of VRAM 8, the value being that obtained by multiplying the contents of work area YINT by n and by adding thereto the display position information Xp (step 33).

Figure 14:
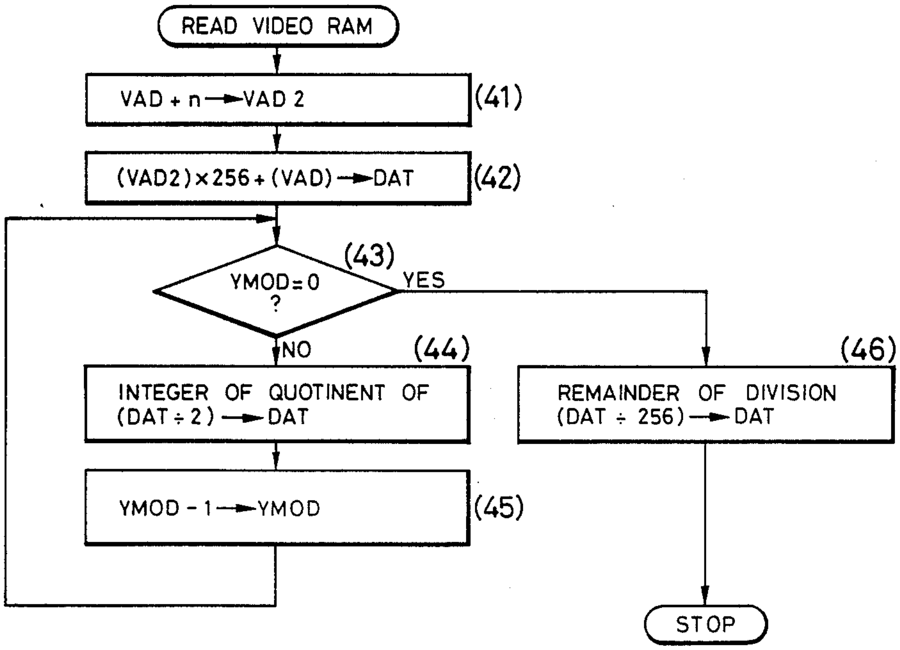

FIG. 14 is a flow chart illustrating a read control procedure of VRAM, wherein (41) to (46) represent a step of the procedure and correspond to step 4 of the flow chart shown in FIG. 8A or FIG. 11A.

The contents of work area VAD are added with n (the total number of dots in column) to store the added result in work area VAD 2 (step 41). The contents of work area VAD 2 is multiplied by 256 and added to the contents of work area VAD to write the result in work area DAT (step 42). Next, it is determined if the contents of work area YMOD stored at step 32 of the flow chart shown in FIG. 13 are "0" or not. If NO, the contents of work area DAT are divided by "2" to store the integer of division into work area DAT (step 44). After the contents of work area YMOD is subtracted by "1" (step 45), the flow returns to step 43.

Alternatively, if YES at step 43, the contents of work area DAT are divided by "256" to store the remainder of the division into work area DAT (step 46) to terminate the read control procedure and advance to step 5 of the flow chart shown in FIG. 8A or FIG. 11A.

Figure 15:
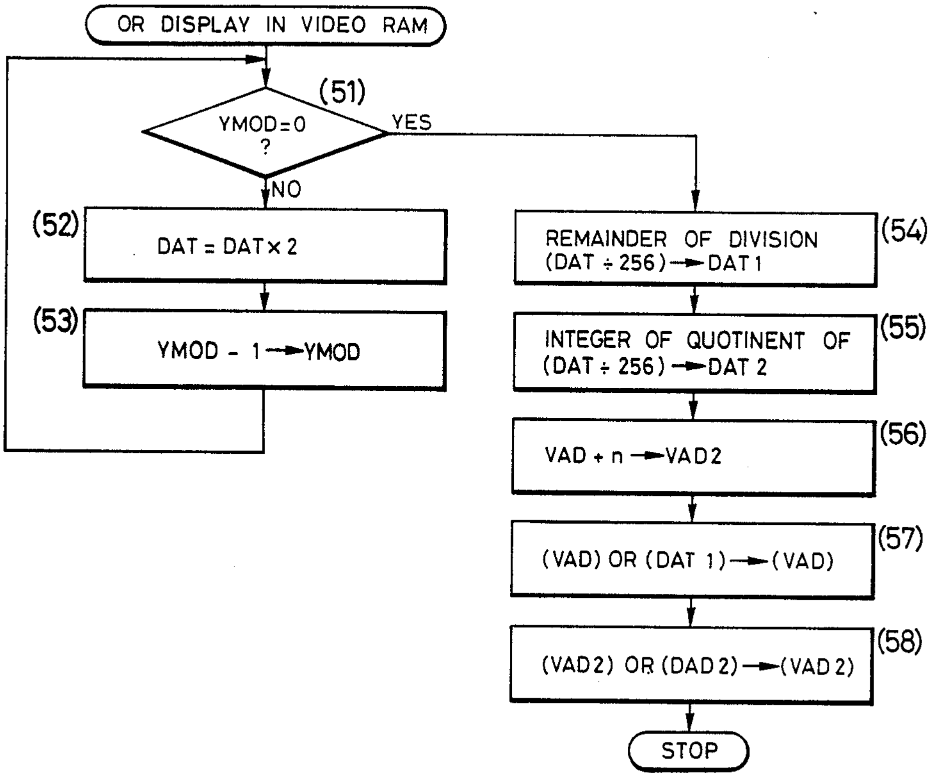

FIG. 15 is a flow chart illustrating the control procedure of OR display in VRAM, wherein (51) to (58) represent a step of the procedure and correspond to step 5 of the flow chart shown in FIG. 8A or FIG. 11A.

First, it is determined if the contents of work area YMOD are "0" or not (step 51). If NO, the contents of work area DAT are multiplied by 2 to store the result in work area DAT (step 52). After the contents of work area YMOD are subtracted by "1" (step 53), the flow returns to step 51.

Alternatively, if YES at determination step 51, the contents of work area DAT are divided by "256" to store the remainder of division into work area DAT 1 (step 54), and store the integer of division into work area DAT 2 (step 55). Next, the contents of work area VAD are added with the total number n of dots in column to store the added result in work area VAD 2 (step 56). Next, an OR operation is performed between the contents of work area VAD and work area VAT 1 to store the operation result in work area VAD (step 57). Also, an OR operation is performed between the contents of work area VAD 2 and work area DAT 2 to store the operation result in work area VAD 2 (step 58). Then the flow advances to step 6 shown in FIG. 11A or step 7 shown in FIG. 13A, respectively following the succeeding steps.

Figure 16:
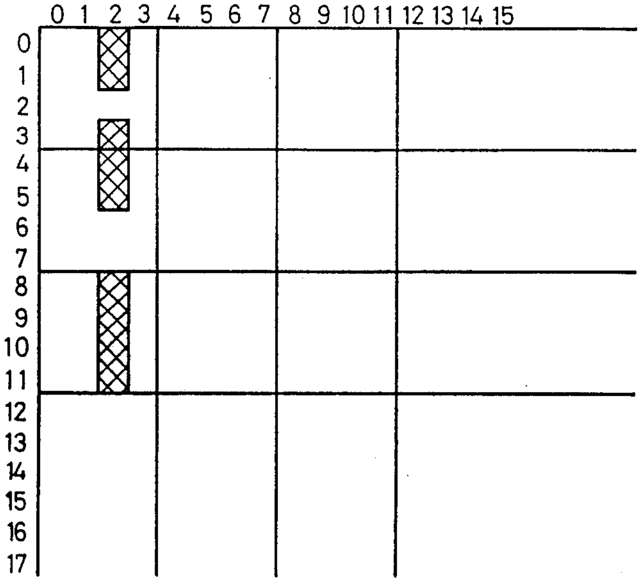
FIG. 16 shows an example of display data stored in the VRAM shown in FIG. 12.

Therefore, assuming that character patterns as shown in FIG. 16 are stored in VRAM 8 (wherein print position information Xp is "2", the contents of work area YP are "1", and the total number n of dots in column is "2"), the value of the work area YINT becomes "0", that of work area YMOD "1", and that of work area VAD "2".

Since the value of work area VAD 2 becomes "962" and that of work area DAT becomes "0F3B" in hexa decimal, the result in judgement step 43 does not become "0". Therefore, the value of work area in judgement step 44 becomes "079D" in hexa decimal, the value of work area YMOD in step 45 becomes "0" and the value of work area DAT becomes "9D" in hexa decimal so that objective one byte can be read.

In case where the value "02" in hexa decimal of work area DAT is OR-displayed in VRAM, since the value of work area YMOD is not "0", the value of work area DAT becomes "04" in hexa decimal at step 52, the value of work area YMOD "0" in step 53, the value of work area DAT 1 "00" in hexa decimal at next step 54, the value of work area DAT 2 "04" in hexa decimal at step 55, the value of work area VAD 2 "962" at step 56, the value of work area VAD "3F" in hexa decimal in step 57, and the value of work area VAD 2 "0F" in hexa decimal at step 58 which is OR-displayed in VRAM 8.

As described so far, the document processing system of this invention comprises a display pattern memory having an address space in one-to-one correspondence with a printable area of a printing unit; a display unit for displaying character pattern dot information stored in said display pattern memory; superposition determination means for determining based on a predetermined operation a superposition between a character pattern of a character code read from said character pattern memory and stored in said display pattern memory and a character pattern to be sequentially input while a character print position is designated, and indication means for indicating the judgement result by said superposition determination means. Therefore, various advantages can be enjoyed. Namely, an input text information can be displayed in just the same way as it is actually printed out. A superposed portion of an input character pattern can be displayed distinguishably from the other character dot patterns already input, at the time when the new character is input. A superposed portion can be visually identified for the purpose of avoiding character superposition and a desired character pattern can be entered readily by the operator at a desired position.

Figure 18:
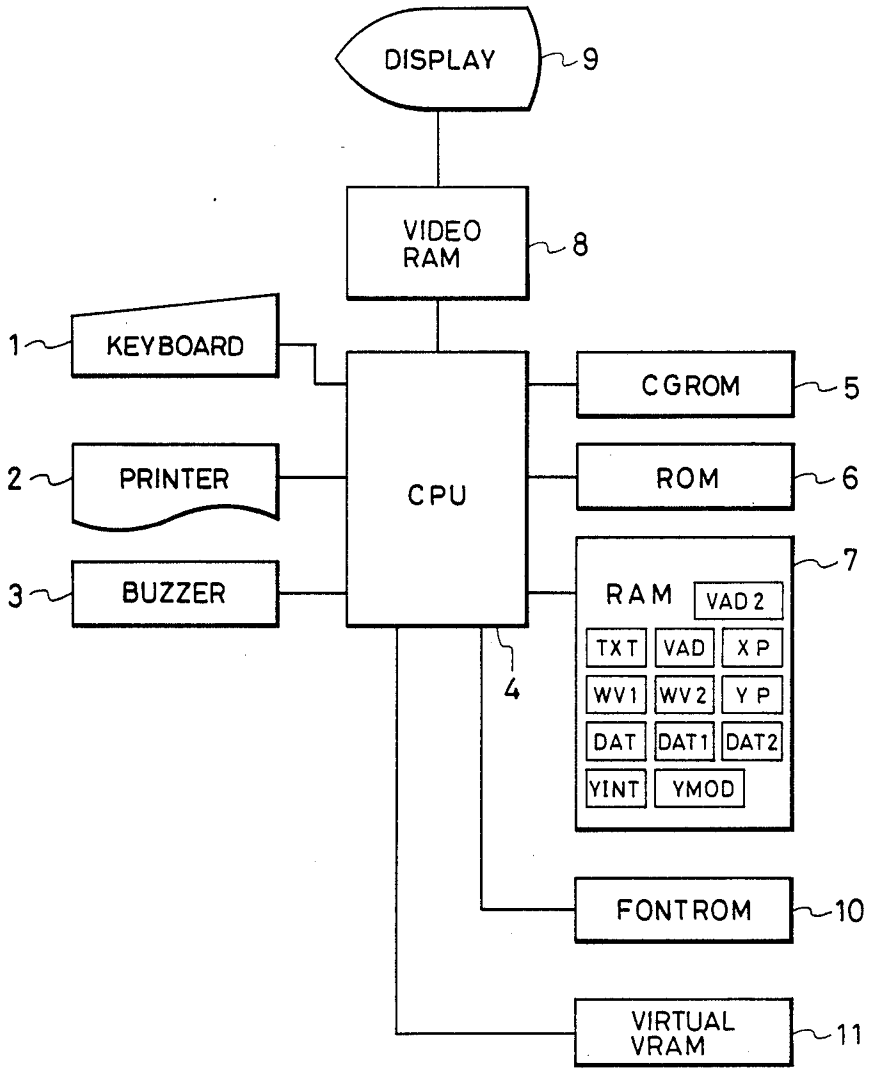
FIG. 18 is a block diagram showing a further embodiment of a document processing system according to the present invention.

FIG. 18 is a block diagram illustrating the structure of an embodiment of a document processing system according to the present invention. A keyboard 1 is constructed of a character key unit from which a character code is input and a control command key unit from which control information necessary for printing is input. The inputted character code and control command are supplied to CPU 4. A printer 2 is used for printing an input character at a desired position. A buzzer 3 which operates as indication means of this invention, is used for generating an alarm sound when an input character is superposed upon an already input character and when an erroneous input is effected from the keyboard 1, to thereby notify the operator of such effect. CPU 4 controls peripheral devices such as the keyboard 1 and printer 2 in accordance with a control program stored in ROM 6 and by using work areas of RAM 7 described later. CGROM 5 functions as a character pattern memory and stores, at predetermined addresses, character patterns (e.g., constructed of 8 x 8 dot matrix) which are in one-to-one correspondence with character codes input from the keyboard 1. ROM 6 stores control programs (including those programs for the steps of the procedure shown in the flow charts described later) to be executed by CPU 4, and associated data. A video RAM (VRAM) 8 functions as a display pattern memory and has a display space in one-to-one correspondence with the printable area of the printer 2. The character pattern developed on VRAM 8 is displayed on a display unit 9 in the form of dot patterns.. A font ROM (FONTROM) 10 operates as determination-reference character pattern store means of this invention, and stores determination reference character patterns (to be described later) corresponding to character patterns stored in CGROM 5 or display pattern memory 5. A virtual VRAM 11 operates as determination-reference character pattern store means of this invention, and stores determination-reference character patterns corresponding to display character patterns read from CGROM 5 and having their addresses corresponding to those of VRAM 8.

CPU 4 which operates as superposition determination means of this invention, determines a superposition between determination-reference character patterns sequentially read from FONTROM 10 and stored in virtual VRAM 11, in accordance with a predetermined arithmetic operation. In this case, display character patterns are stored in VRAM 8 simultaneously with storing determination-reference character patterns. The determination result is distinguishably displayed on the display unit 9 and the buzzer 3 is actuated to notify the operator of such effect. FONTROM 10 is constructed of a dot matrix larger in size than that of CGROM 5 in order to have an enlarged and more detailed font image than that of CGROM 5. Similarly, virtual VRAM 11 used for storing character patterns of FONTROM 10 therein has a larger memory space, e.g., 16×16 dots per one determination-reference character pattern in this embodiment. The address processing is conducted in a similar manner to that of VRAM 8.

The operation of the document processing system shown in FIG. 18 will be described next.

Character data input from the keyboard 1 are sequentially stored in a work area TXT (text store area) of RAM 7, and the associated print position information determined by an input from the keyboard 1 and stored as the content of a work area XP (store area for print start position information in the x-direction) of RAM 7 are also sequentially stored in work area TXT. Each time a character is stored, CPU 4 executes the control program stored in ROM 6 in the following manner. The contents of CGROM 5 are displayed on the display unit 9 at the positions corresponding to addresses of VRAM 8 while performing a logical OR operation, the addresses corresponding to the associated character print positions on a printing medium. Thus, the display unit 9 visually displays the OR operation result. Simultaneously with displaying character patterns, CPU 4 causes a determination-reference character pattern corresponding to a character pattern read from CGROM 5 to be read from FONTROM 10 and written it in virtual VRAM 11 at addresses corresponding to those of RAM 8 while performing an Exclusive-OR operation or an OR operation. By this Exclusive-OR operation, a superposed portion of determination-reference character patterns on virtual VRAM 11 can be displayed distinguishably from the remainder on the display unit 9. Further, a superposition determination between determination-reference character patterns can be effected by the logical 0R operation.

Figure 19A:
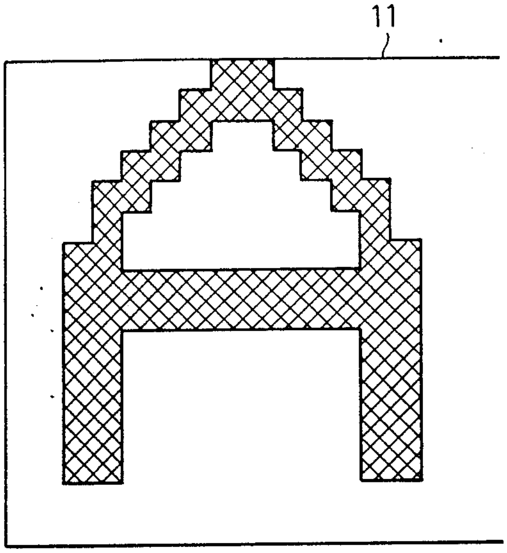
FIGS. 19A and 19B illustrate an operation for judging a superposition of an input character according to the present invention.
Figure 19B:
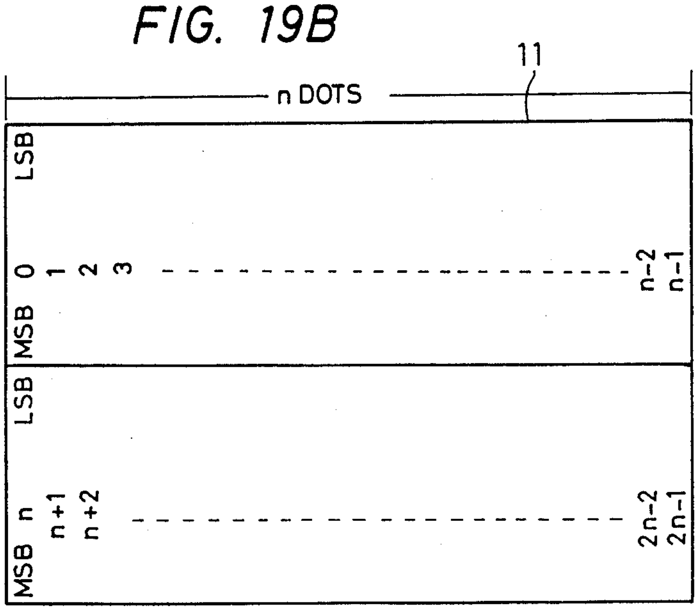

Next, the operation for determining a superposition position of an input character according to this invention will be described with reference to FIGS. 19A and 19B wherein similar elements to those shown in FIG. 18 are represented by using identical reference numerals.

As seen from the figures, the size of a determination-reference character pattern stored in FONTROM 10 is constructed of a matrix of 16×16 dots in this embodiment, which is two times larger than the matrix size shown in FIG. 3B. The size of virtual VRAM 11 for storing a determination-reference character pattern as shown in FIG. 19A is correspondingly constructed such that the number of dots in row is twice as large as the memory space of VRAM 8 shown in FIG. 4 to thereby develop a determination-reference character pattern in the area from the 0-th byte to (2n−1)-th byte thereof.

In accordance with the control program in ROM 6, CPU 4 first saves a part of the contents of virtual VRAM 11 at the addresses corresponding to those subjected to a logical operation with the contents of FONTROM 10 on the display area of virtual VRAM 11, into a work area WV1 of RAM 7. Then, the contents of virtual VRAM 11 with the newly input determination-reference character pattern written therein are stored in a work area WV2 and thereafter, the contents of FONTROM 10, WV1 and WV2 are subjected to a predetermined logical operation to enable to determine if the newly input determination-reference character pattern from FONTROM 10 into virtual VRAM 11 is superposed on the already input determination-reference character pattern on virtual VRAM 11. Although the resolving power of virtual VRAM 11 is different from that of VRAM 8, a superposition on virtual VRAM 11 is equivalent to those on the display unit 9 and VRAM 8. The determination result is notified by means of the buzzer 3. Thus, irrespective of a physical resolving power of the display unit 9, a superposition of a character pattern input from the keyboard 1 can be automatically notified. In addition, the superposed portion can be displayed on the display unit 9 distinguishably from the remaining dot patterns, e.g., by means of a blanked portion, so that the operator can recognize it and adjust the print position to thereby enable to reduce misprints.

The operation for determining superposition of an input character according to this invention will be described with reference to FIGS. 20A and 20B and FIGS. 21A and 21B.

FIGS. 20A and 20B are truth tables for the OR and Exclusive-OR operations in the superposition judgement procedure, wherein A and B denotes an input and X denotes an output.

Figure 21A:
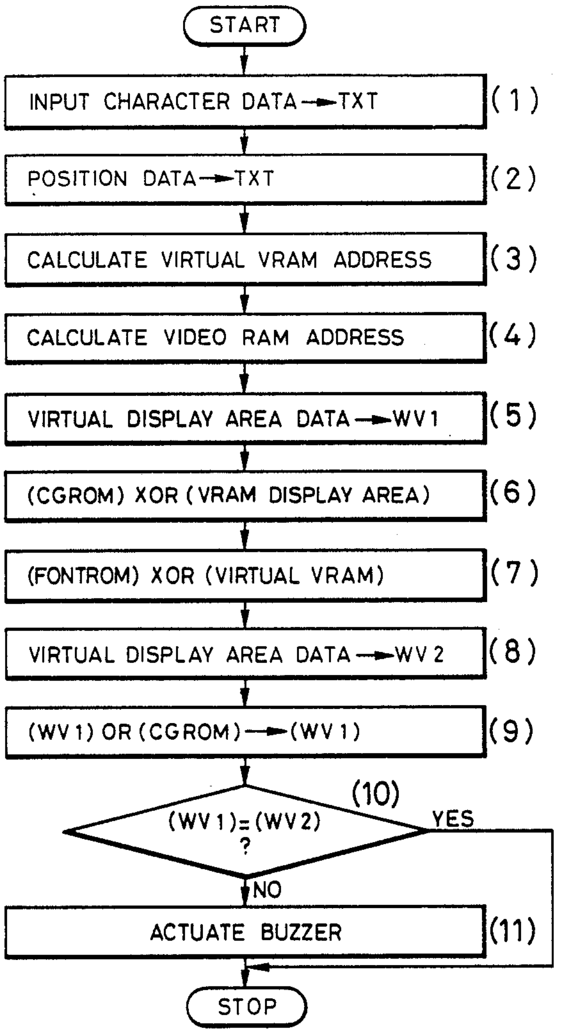
FIGS. 21A to 21C are flow charts illustrating a superposition judgement procedure according to the present invention.
Figure 21B:
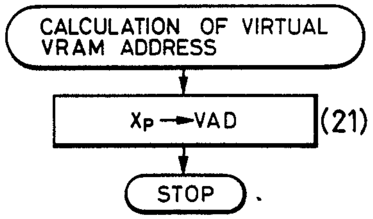
Figure 21C:
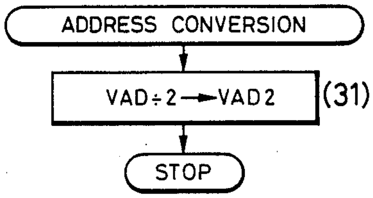

FIGS. 21A to 21C are flow charts illustrating the superposition determination procedure of this invention, wherein (1) to (11), (21) and (31) denote a step of the procedure.

First, character data input from the keyboard 1 is stored in work area TXT of RAM 7 (step 1), and print position data (display position information) Xp is stored in work area TXT of RAM 7 (step 2). Then, the address at virtual VRAM 11 corresponding to a print position is calculated in accordance with the flow shown in FIG. 21B (step 3), and the address at VRAM 8 corresponding to a print position is calculated in accordance with the flow shown in FIG. 21C (step 4). The calculated address VAD at VRAM 8 is used as a reference address to copy data within a determination-reference character display area of virtual VRAM 11, i.e., within a region of 16×16 dots in row and column, into work area WV1 (step 5). Thereafter, the pattern information of a character to be displayed (display character pattern) is read from CGROM 5 and subjected to an Exclusive-OR operation with the already input character pattern on the display area of VRAM 8 to display the operation result (step 6). Simultaneously with reading the display character pattern, a determination-reference character pattern read from FONTROM 10 is subjected to an Exclusive-0R operation and written in virtual VRAM 11 (step 7). This operation corresponds to an operation of setting the display character pattern read from CGROM 5 as input A of FIG. 20A and the contents of VRAM 8 in the display area as input B, performing an Exclusive-0R operation therebetween, and transferring output X to the display area of VRAM 8.

Then, the data in the display area of virtual VRAM 11 are copied into work area WV2 (step 8). Thereafter, a logical OR operation is performed between the contents of work area WV1 and work area WV2 (step 9). This operation corresponds to an operation of setting the contents of work area WV1 as input A of FIG. 20A and the contents of work area WV2 as input B, performing an OR operation therebetween, and transferring output X into work area WV2.

Next, it is determined if the contents of work areas WV1 and WV2 coincide with each other (step 10). If YES, the determination procedure is terminated. If NO, it is judged that the already and newly written determination-reference character patterns are superposed so that the buzzer 3 is actuated to notify the operator of such effect (step 11).

In the above step 3, the flow shown in FIG. 21B is executed. Since this embodiment employs the display unit 9 constructed of one line, the display position information Xp is converted into the address VAD at VRAM 8 (step 21) to follow step 4 and succeeding steps.

In the above step 4, the flow shown in FIG. 21C is executed. In this embodiment, the address can be obtained by dividing the contents of work area VAD by "2" which is a ratio of 16 dots in column of FONTROM 10 to 8 dots in column of the display unit 9 (step 31).

The above embodiment has been described using the display unit 9 constructed of a matrix of $8\times n$ dots in row and column. However, the invention is also applicable to the display unit constructed of a matrix of $(m\times 8)\times n$ dots in row and column.

Figure 22A:
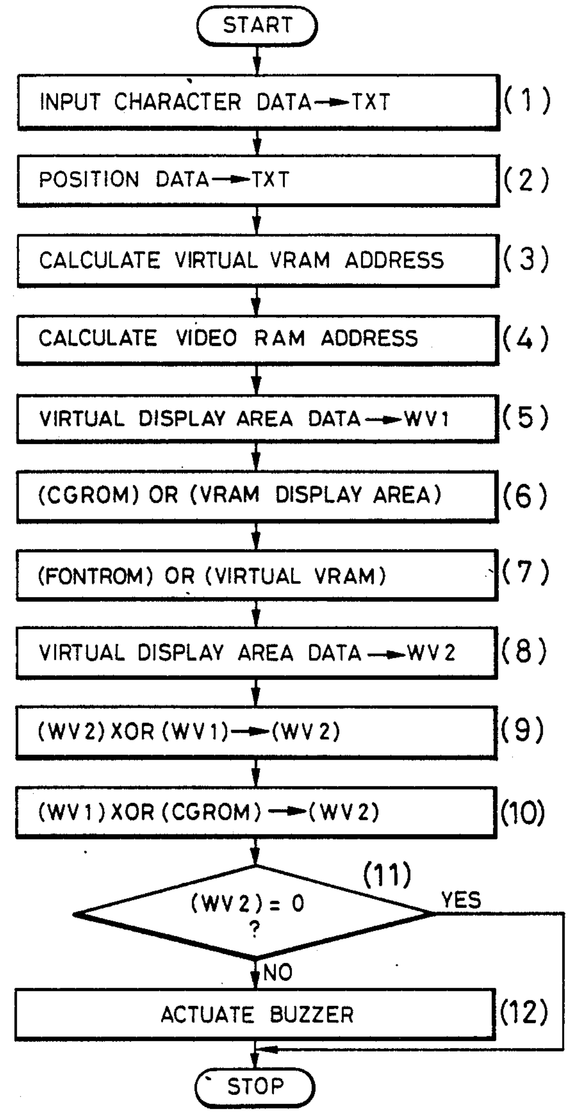
FIGS. 22A to 22C are flow charts illustrating another superposition judgement procedure according to the present invention.
Figure 22B:
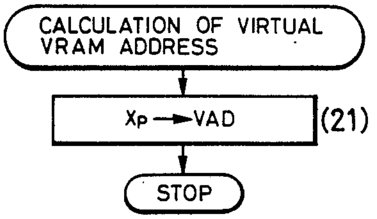
Figure 22C:
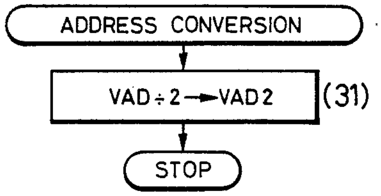

FIGS. 22A to 22C are flow charts illustrating the superposition determination procedure of this invention, wherein (1) to (11), (21) and (31) denote a step of the procedure.

First, character data inputted from the keyboard 1 is stored in work area TXT of RAM 7 (step 1), and print position data (display position information) Xp is stored in work area TXT of RAM 7 (step 2). Then, the address at virtual VRAM 11 corresponding to a print position is calculated in accordance with the flow shown in FIG. 22B (step 3), and the address at VRAM 8 corresponding to a print position is calculated in accordance with the flow shown in FIG. 22C (step 4). The calculated address VAD at VRAM 8 is used as a reference address to copy data within a determination-reference character display area of virtual VRAM 11, i.e., within a region of $16\times 16$ dots in row and column, into work area WV1 (step 5). Thereafter, the pattern information of a character to be displayed (display character pattern) is read from CGROM 5 and subjected to an Exclusive-OR operation with the already input character pattern on the display area of VRAM 8 to display the operation result (step 6). Simultaneously with reading the display character pattern, a determination-reference character pattern read from FONTROM 10 is subjected to an Exclusive-OR operation and written in virtual VRAM 11 (step 7). This operation corresponds to an operation of setting the display character pattern read from CGROM 5 as input A of FIG. 20A and the contents of VRAM 8 in the display area as input B, performing an OR operation therebetween, and transferring output X to the display area of VRAM 8.

Then, the data in the display area of virtual VRAM 11 are copied into work area WV2 (step 8). Thereafter, a logical Exclusive-OR operation is performed between the contents of work area WV1 and work area WV2 (step 9). This operation corresponds to an operation of setting the contents of work area WV1 as input A of FIG. 20A and the contents of work area WV2 as input B, performing an OR operation therebetween, and transferring output X into work area WV2.

Next, an Exclusive-OR operation is performed between the contents of work area WV2 and the character pattern read from CGROM 5 to write the operation result into work area WV2 (step 10). Next, it is determined if the contents of work area WV2 are all "0" (step 11). If YES, the determination procedure is terminated. If NO, it is determined that the already and newly written determination-reference character patterns are superposed so that the buzzer 3 is actuated to notify the operator of such an effect (step 11).

In the above step 3, the flow shown in FIG. 22B is executed. Since this embodiment employs the display unit 9 constructed of one line, the display position information Xp is converted into the address VAD at VRAM 8 (step 21) to follow step 4 and succeeding steps.

In the above step 4, the flow shown in FIG. 22C is executed. In this embodiment, the address can be obtained by dividing the contents of work area VAD by "2" which is a ratio of 16 dots in column of FONTROM 10 to 8 dots in column of the display unit 9 (step 31).

Figure 23:
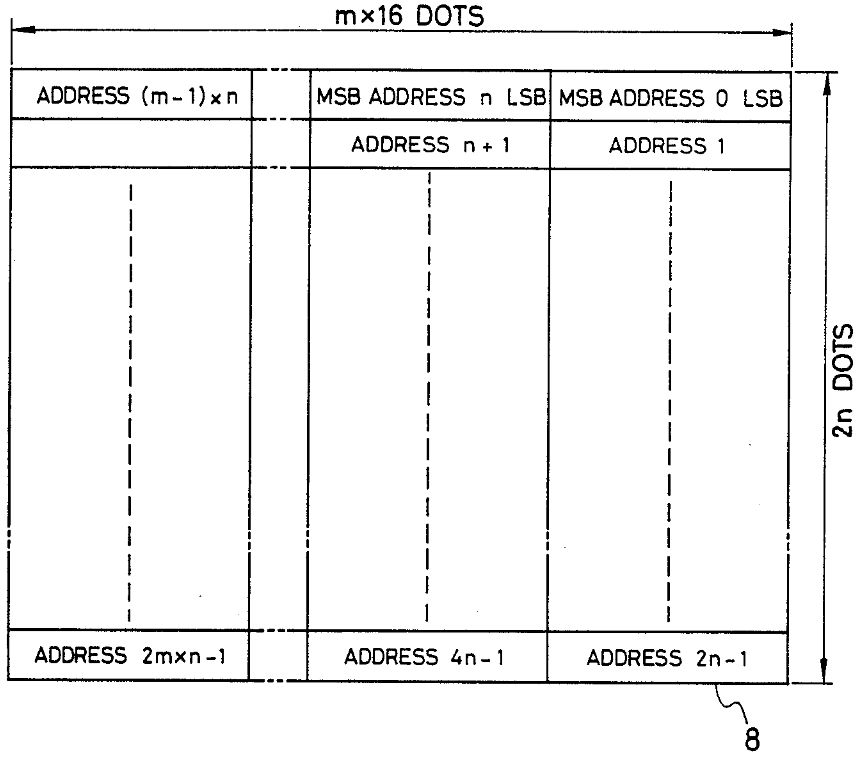
FIG. 23 shows the memory space of VRAM used in a still further embodiment of a document processing system according to the present invention.

FIG. 23 shows the memory space of VRAM used in another embodiment of the document processing system according to the present invention, the memory space being constructed of, e.g. a matrix of $(m\times 8)\times n$ dots in row and column.

Figure 24:
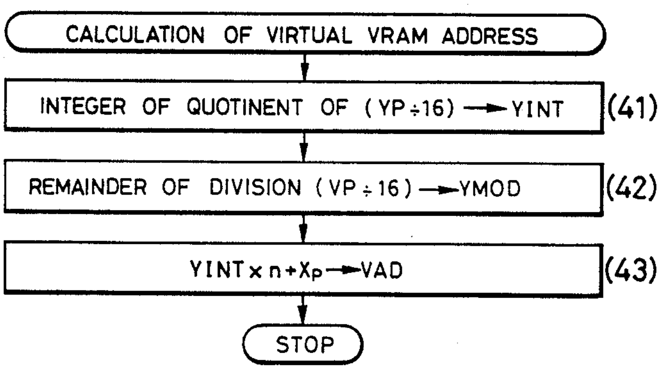
FIG. 24 is a flow chart illustrating the operation of the VRAM shown in FIG. 23.

FIG. 24 is a flow chart illustrating the procedure of calculating the address of VRAM having the memory space shown in FIG. 23, wherein (41) to (43) represent a step of the procedure and correspond to step 3 of the flow chart shown in FIG. 21A or FIG. 22A.

When a print position in row is input from the keyboard 1, the row position information is stored in a work area YP of RAM 7 whereas the position on virtual VRAM 11 is stored in work areas VAD and YMOD.

Then, at step 3 of the flow chart shown in FIG. 21A or FIG. 22A, the contents of work area YP are divided by the number of unit dots in row, i.e., "16" (corresponding to the number of unit dots in row of FONTROM 10) to write the integer of quotient in a work area YINT (step 41). The remainder of division of the contents of work area YP by "16" is stored in work area YMOD (step 42). Next, CPU 4 sets a value as the address VAD of VRAM 8, the value being that obtained by multiplying the contents of work area YINT by n (corresponding to the total number of dots in column of virtual VRAM 11) and by adding thereto the display position information Xp (step 33). Thereafter, the above steps are repeated each time virtual VRAM 11 is accessed whereby using the calculated address VAD as a reference, the contents of address adjacent thereto is shifted by the value of work area YMOD to thereby effect a virtual display at a desired position in row. Thus, the present invention can be applied also to a combination of virtual VRAM with a dissolving power of $(m\times 16)$ in row and a display unit with a lower dissolving power.

As described so far, the document processing system of this invention comprises a display pattern memory having an address space in one-to-one correspondence with a printable area of a printing unit; a display unit for displaying character pattern dot information stored in said display pattern memory; determination-reference character pattern store means for storing a determination-reference character pattern corresponding to a character pattern stored..in said display pattern memory; read-out determination-reference character pattern store means for storing a determination-reference character pattern corresponding to a display character pattern read from said display pattern memory, at an address corresponding to that of said display pattern memory; superposition determination means for determining, based on a predetermined operation and in parallel with development of a character pattern into said display pattern memory, a superposition between determination-reference character patterns read from said determination-reference character pattern store means and written in said read-out determination-reference character pattern store means; and indication means for indicating the determination result by said superposition determination means. Therefore, various advantages can be enjoyed. Namely, an input text information can be displayed in just the same way as it is actually printed out. If a character pattern which causes a superposition is designated, the superposed portion of the input character pattern can be displayed clearly and distinguishably from the other character dot patterns already input, at the time when the new character is input. Therefore, the operator can adjust again the print position at an optimum position prior to printing. Therefore, characters can be effectively input while maintaining a good printing appearance without misprints.

I claim:

1. A document processing system comprising:
- a display pattern memory for storing a pattern to be displayed;
- a display unit for displaying the pattern stored in said display pattern memory;
- reference character pattern store means for storing a reference character pattern corresponding to the pattern stored in said display pattern memory;
- read-out reference character pattern store means for storing a reference character pattern corresponding to a display pattern read from said display pattern memory;
- superposition determination means for determining, based on a predetermined operation and in parallel with development of a pattern in said display pattern memory, whether there is a superposition between reference character patterns read from said reference character pattern store means and written in said read-out reference character pattern store means; and
- indication means for indicating the determination made by said superposition determination means.

2. A document processing system according to claim 1, wherein said indication means distinguishably displays a superposed pattern of patterns displayed on said display unit, in accordance with a determination made by said superposition determination means.

3. A document processing system according to claim 1, wherein said indication means actuates an alarm when a superposed pattern occurs, in accordance with a determination made by said superposition determination means.

4. A document processing system according to claim 1, wherein said display pattern memory has an address space in one-to-one correspondence with a printable area of a printing unit, wherein said display unit displays character pattern dot information stored in said display memory pattern, wherein said read-out reference character pattern store means stores a reference character pattern corresponding to the display character pattern read from said display pattern memory at an address corresponding to that of said display pattern memory, and wherein said superposition determination means determines, based on a predetermined operation and in parallel with development of a character pattern in said display pattern memory, whether there is a superposition between reference character patterns read from said reference character pattern store means and written in said read-out reference character pattern store means.

5. A document processing system according to claim 4, wherein said indication means distinguishably displays a superposed pattern of character patterns displayed on said display unit, in accordance with a determination made by said superposition determination means.

6. A document processing system comprises:
- a display pattern memory for storing a pattern to be displayed;
- a display unit for displaying the pattern stored in said display pattern memory;
- superposition determination means for determining, based on a predetermined operation, whether there is a superposition between the pattern stored in said display pattern memory, and a character pattern to be sequentially input into said system, while a character print position is designated; and
- indication means for indicating the determination made by said superposition determination means.

7. A document processing system according to claim 6, wherein said indication means distinguishably displays a superposed pattern of patterns displayed on said display unit, in accordance with a determination made by said superposition determination means.

8. A document processing system according to claim 6, wherein said indication means actuates an alarm when a superposed pattern occurs, in accordance with a determination made by said superposition determination means.

9. A document processing system according to claim 4, wherein said display pattern memory has an address space in one-to-one correspondence with a printable area of a printing unit, wherein said display unit displays character pattern dot information stored in said display pattern memory, and wherein said superposition determination means determines, based on a predetermined operation, whether there is a superposition between a character pattern of a character code read from a character pattern memory and stored in said display pattern memory, and a character pattern to be sequentially input into said system, while a character print position is designated.

10. A document processing system according to claim 9, wherein said indication means distinguishably displays a superposed pattern of character patterns displayed on said display unit, in accordance with a determination made by said superposition determination means.

* * * * *

UNITED STATES PATENT AND TRADEMARK OFFICE

CERTIFICATE OF CORRECTION

PATENT NO. : 4,947,343

DATED : August 7, 1990

INVENTOR(S) : TAKASHI AMARI

It is certified that error appears in the above-identified patent and that said Letters Patent is hereby corrected as shown below:

AT [57] ABSTRACT

Line 3, "corresponding" should read --correspondence--.

SHEET 10 OF 18

FIG. 13, "QUOTINENT" should read --QUOTIENT--.
FIG. 14, "QUOTINENT" should read --QUOTIENT--.

SHEET 11 OF 18

FIG. 15, "QUOTINENT" should read --QUOTIENT--.

SHEET 18 OF 18

FIG. 24, "QUOTINENT" should read --QUOTIENT--.

COLUMN 5

Line 53, "denotes" should read --denote--.
Line 57, "denotes" should read --denote--.

COLUMN 7

Line 52, "denotes" should read --denote--.

COLUMN 9

Line 6, "is" should read --are--.
Line 13, "is" should read --are--.

UNITED STATES PATENT AND TRADEMARK OFFICE

CERTIFICATE OF CORRECTION

PATENT NO. : 4,947,343
DATED : August 7, 1990
INVENTOR(S) : TAKASHI AMARI

It is certified that error appears in the above-identified patent and that said Letters Patent is hereby corrected as shown below:

COLUMN 10

Line 16, "judgement" should read --determination--.

COLUMN 11

Line 40, "it" should be deleted.

COLUMN 12

Line 32, "denotes" should read --denote--.

COLUMN 14

Line 57, "dissolving" should read --resolving--.
Line 58, "dis-" should read --re---.
Line 68, "stored..in" should read --stored in--.

UNITED STATES PATENT AND TRADEMARK OFFICE

CERTIFICATE OF CORRECTION

PATENT NO. : 4,947,343

DATED : August 7, 1990

INVENTOR(S) : TAKASHI AMARI

It is certified that error appears in the above-identified patent and that said Letters Patent is hereby corrected as shown below:

COLUMN 16

Line 45, "4," should read --6,--.

Signed and Sealed this

Thirtieth Day of June, 1992

*Attest:*

DOUGLAS B. COMER

*Attesting Officer*

*Acting Commissioner of Patents and Trademarks*